Patented Nov. 19, 1940

2,221,817

UNITED STATES PATENT OFFICE 2,221,817

3-AMINO-4-HYDROXY-PHENYLARSINE OXIDE AND A PROCESS OF MAKING IT

Albert B. Scott, Douglaston, Long Island, N. Y., Ralph D. Hummel, Benjamin F. Tullar and Joseph Wainwright, Detroit, Mich., assignors to Parke, Davis & Company, Detroit, Mich., a corporation of Michigan No Drawing. Application August 21, 1937, Serial No. 160,350

6 Claims. (Cl. 260—440)

The invention relates to the free base, 3-amino-4-hydroxy phenylarsine oxide and to methods for preparation of the same.

Although a pure hydrochloride of 3-amino-4-hydroxy phenylarsine oxide has been known, the free base itself has never been isolated as a pure compound.

An object of the invention is to obtain the free base, 3-amino-4-hydroxy phenylarsine oxide, in pure crystalline form.

Another object is to provide methods for obtaining the above mentioned free base by relatively simple procedures which can be readily duplicated. It is also an object of the invention to obtain high yields of free base in a high degree of purity.

Another object of the invention is to obtain the free base by a relatively inexpensive method capable of being carried out by means of ordinary apparatus. It is a further object of the invention to obtain 3-amino-4-hydroxy phenylarsine oxide free base directly from the reaction mixture in which it is produced by reduction of the corresponding arsonic acid, and to obtain it in such a high degree of purity that difficulties, due to contamination by large amounts of impurities and great tendency of the free base to rapidly decompose, are largely and even entirely overcome.

The above objects, and others, are realized by one procedure of this invention by starting with the known compound, 3-amino-4-hydroxy phenylarsonic acid, preferably in very pure form, reducing the arsonic acid to its corresponding arsine oxide and separating the free base of the oxide from the reaction mixture under certain definite conditions, especially as regards the pH of the solution from which the free base is precipitated and separated. After the free base is separated from the reaction mixture by the new process, it may be used as such or further purified, if necessary, and made up in solution form or in other modification as desired.

It has now been found that high yields of 3-amino-4-hydroxy phenylarsine oxide of high purity may be obtained by regulating the pH of a solution containing this compound within a range of about pH 5 to pH 7.0 or, preferably, adjusting to pH 6.2. Under these conditions 3-amino-4-hydroxy phenylarsine oxide precipitates out in crystalline form.

It has further been found that the free base product of this invention differs markedly, not only in physical and chemical properties, but also in having great therapeutic value, from the impure product previously described by Ehrlich and Bertheim, Ber. 45: 756 (1912.) The difference is especially marked with respect to solubility, the product of this invention dissolving only slowly in ethyl and methyl alcohols, whereas it has been found that the arsenical present in the crude product of Ehrlich and Bertheim is very readily soluble in ethyl and methyl alcohols. The product of this invention is also entirely different from the extremely impure and unstable mixture previously described, in being of such uniform purity as to make it therapeutically valuable, whereas the prior mixtures were not only very impure but varied greatly in trivalent arsenic content from one preparation to the other, so that they were entirely unsatisfactory for therapeutic use.

The invention will be more readily understood and appreciated by reference to the following examples which are given merely by way of illustration and are not intended to limit the invention beyond the scope of the claims appended hereto.

Example 1

92 grams of pure white crystalline hydrochloride of 3-amino-4-hydroxy phenylarsonic acid of high degree of purity is dissolved in 500 cc. of water which has been boiled out to eliminate air, and 180 cc. of concentrated hydrochloric acid and 12 grams of potassium iodide are added with stirring. The mixture is cooled to 10° C. and 25 grams of sulfur dioxide gas passed in rapidly while the temperature of the reaction mixture is kept below 15° C. After the sulfur dioxide has been passed in, the stirring of the mixture is continued for a short time and it is then made neutral by adding strong aqueous ammonia to Congo red paper at —10° C. The neutralized reaction mixture is then diluted to 4 liters with air-free water and diluted ammonium hydroxide added to bring the solution to a pH between 6 and 7. The sides of the vessel are scratched with a glass rod and this causes an immediate rapid precipitation of about 90% of the theoretical amount of 3-amino-4-hydroxy phenylarsine oxide free base in the form of pure white crystals. The crystals are filtered off and washed with about 500 cc. of air-free water. The crystals are dried in vacuo and analyzed by titration with iodine to determine the content of trivalent arsenic. 34.35% of trivalent arsenic is found, as compared with 34.53% trivalent arsenic called for by theory for 3-amino-4-hydroxy phenylarsine oxide of formula

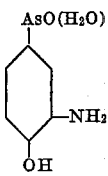

The white crystals are found to be in the form of rectangular prisms.

Instead of starting in this and the following examples with the hydrochloride of the arsonic acid, the pure free base, its sodium salt, etc., and equivalent amount of hydrochloric acid may be used.

*Example 2*

116 grams of 3-amino-4-hydroxy phenylarsonic acid hydrochloride, or the equivalent quantity of its free base mixed with hydrochloric acid, are dissolved in 550 cc. of water containing 220 cc. of concentrated (36%) hydrochloric acid. 15 grams of KI is added and then 35 grams of sulfur dioxide passed in the mixture over a period of 30 minutes at about 10–15° C. The reaction mixture is then made faintly alkaline to litmus by adding concentrated ammonium hydroxide solution while keeping the temperature below 0° C. The pH of the solution is then brought to about 5.9 with glacial acetic acid, whereupon some 3-amino-4-hydroxy phenylarsenoxide separates in amorphous form. After seeding with crystals of the desired substance or scratching the sides of the vessel containing the solution, a crystalline precipitate of 3-amino-4-hydroxy phenylarsenoxide comes down. By allowing the solution to stand for 3 or 4 hours, more crystals come down and the amorphous form which first precipitated out is converted over into crystalline form. In this way, a final good yield of uniform crystalline product is obtained. Arsenic analyses show approximately that required by theory for a compound of the formula given under Example 1 above.

*Example 3*

12 lbs. of the hydrate of 3-amino-4-hydroxy phenylarsonic acid hydrochloride is added to about 8 gallons of water at 40° C. and 14 lbs. 5 ounces of concentrated hydrochloric acid is added with stirring. At this point complete solution results. 12 lbs. and 7 ounces more of concentrated hydrochloric acid is added. One lb. 9 ounces of potassium iodide is added to the solution with cooling to 0° C. 2 lbs. 9 ounces of sulfur dioxide is then passed in to the reaction mixture while maintaining the temperature below about 16° C. About 20 to 30 minutes is taken for adding the sulfur dioxide. The reaction mixture is cooled to −10° C. whereupon a heavy precipitate (probably dichloroarsine hydrochloride) separates. The reaction mixture is then neutralized by the slow addition of strong ammonium hydroxide (about 26 lbs. of concentrated ammonium hydroxide diluted with an equal weight of water is necessary). While adding the ammonia water the mixture is stirred vigorously and the temperature kept below −10° C. The ammonium hydroxide dissolves the heavy precipitate mentioned above. After about one-half of the ammonium hydroxide is added, 12 gallons of ice water is added. The diluted reaction mixture is allowed to stand one-half hour and is then filtered. The crystalline material on the filter is freed from chloride by washing with ice water. The crystals are then dried in a vacuum at 35° C. for 15 hours.

The crystalline free base of the examples is only 0.35% soluble in water at 25° C. It is very soluble in ethylene and propylene glycols, very soluble in ethyl alcohol but only after very long shaking, and insoluble in ether and benzene. When its solution is chilled quickly, long rectangular prisms are obtained. By allowing its solution to cool slowly, chunky tablets are produced. The pH of its aqueous solution saturated by shaking with the crystals several hours at room temperature is 6.85 (glass electrode).

One of the outstanding properties of the free base of the invention is its great stability over and above the crude impure mixtures previously known. It can be made up in dilute aqueous solution without danger of oxidizing very rapidly, as in the case with the known impure mixture of amorphous product. For example, 0.1 gram of the crystalline free base in 20 cc. of water is heated at 60° C. until dissolved. The solution is then allowed to cool with free access of air. In spite of this treatment, no appreciable oxidation is found upon iodine titration for trivalent arsenic. After standing for more than six months in stoppered but unsealed bottles, samples of the product lose only about 0.25% of trivalent arsenic.

It will be noted that Examples 1 and 3 differ from Example 2 in that the reaction solution containing the 3-amino-4-hydroxy phenylarsine oxide free base is diluted with water either as such or in the form of an aqueous solution containing ammonium hydroxide. Although this feature of diluting the reaction mixture is not necessary, as shown by Example 2, it is the preferred method since the yields of product are much greater. The addition of water to the reaction mixture causes more of the crystalline product to separate out. This feature of diluting to cause precipitation has been carefully investigated and it has been found that for practical purposes it is advisable to bring the final reaction solution to a dilution not less than about 1500 cc. per 100 grams of 3-amino-4-hydroxy phenylarsonic acid hydrochloride used at the beginning of the reaction. This dilution gives the usual yield of about 90% or more of free base of the oxide. It would not be economical to increase the final dilution above about 5000 cc. per 100 grams of arsonic acid hydrochloride used, because the free base of the oxide has a moderate solubility and any greater dilution would cause less of the crystalline product to separate.

Example 2 shows making the reaction solution alkaline followed by the addition of acid to bring the pH within the desired range of about pH 5 to pH 7 or to the preferred pH of about 6.2. However, as shown by Examples 1 and 3, the preferred method is to directly reduce the acidity by the addition of an alkaline neutralizing reagent to the less acid pH found suitable for precipitation of the desired crystalline product.

Although ammonium hydroxide is used in the above examples to neutralize the acidity of the reaction solution, it is not necessary to use this particular neutralizing agent since, in general, any basic or alkaline compound that is sufficiently alkaline to reduce the acidity to the pH range of about 5 to 7 may be used. For example, ammonium carbonate, methyl ammonium hydroxide, sodium bicarbonate, ammonium acetate, sodium lactate, sodium acetate, sodium hydroxide, sodium carbonate, potassium acetate, potassium bicarbonate, potassium hydroxide may be used also. Obviously, some alkaline reagents will be preferred over others. Ammonium hydroxide and ammonium carbonate have been found to be most desirable, because their use results in a product of the highest degree of purity as well as giving very good yields.

The hydrochloride of 3-amino-4-hydroxy phenylarsonic acid is used in the examples. However, any soluble salt of this arsonic acid with a strong acid may be used. Preferably, a hydrohalide of 3-amino-4-hydroxy phenylarsonic acid is used as the starting material, such as the hydrochloride, hydrobromide or hydroiodide.

What we claim as our invention is:

1. Process for the production of 3-amino-4-hydroxy phenylarsine oxide which comprises reducing 3-amino-4-hydroxy phenylarsonic acid in a solution of a strong acid, hydrolyzing and hydrating the reaction product, and adjusting the acidity of the solution of the reaction product to a pH between 5 and 7 to cause precipitation of crystalline 3-amino-4-hydroxy phenylarsine oxide.

2. Process for the production of 3-amino-4-hydroxy phenylarsine oxide which comprises reducing 3-amino-4-hydroxy phenylarsonic acid in a solution of a strong acid, and hydrolyzing the reaction product by adding ammonium hydroxide and diluting quantities of water to the reaction solution to adjust the acidity thereof between a pH of 5 and 7 to cause precipitation of crystalline 3-amino-4-hydroxy phenylarsine oxide.

3. Process for the production of 3-amino-4-hydroxy phenylarsine oxide which comprises reducing 3-amino-4-hydroxy phenylarsonic acid hydrohalide in strong acid solution with an iodide and sulfurous acid to 3-amino-4-hydroxy phenylarsine oxide, and adding ammonium hydroxide and diluting quantities of water to the reaction solution with adjustment of the acidity thereof to a pH of about 6.2 to cause precipitation of crystalline 3-amino-4-hydroxy phenylarsine oxide.

4. Process for the production of 3-amino-4-hydroxy phenylarsine oxide which comprises reducing 3 amino-4-hydroxy phenylarsonic acid hydrochloride in strong acid solution with an iodide and sulfur dioxide, and adding ammonium hydroxide and diluting quantities of water to the reaction solution with adjustment of the acidity thereof to a pH of 6.2 to cause precipitation of crystalline 3-amino-4-hydroxy phenylarsine oxide.

5. In a process for the production of 3-amino-4-hydroxy phenylarsine oxide, the step which comprises adjusting the dilution of a solution containing 3-amino-4-hydroxy phenylarsine oxide at a pH of about 5 to 7 suitable for the separation from said solution of crystalline 3-amino-4-hydroxy phenylarsine oxide.

6. Hydrated crystalline 3-amino-4-hydroxy phenylarsine oxide.

ALBERT B. SCOTT.
RALPH D. HUMMEL.
BENJAMIN F. TULLAR.
JOSEPH WAINWRIGHT.